3,021,329
DIALDEHYDE STARCH-MELAMINE DERIVATIVES

Peter J. Borchert, Elkhart, Ind., assignor to Miles Laboratories, Inc., Elkhart, Ind., a corporation of Indiana
No Drawing. Filed Nov. 28, 1958, Ser. No. 776,705
5 Claims. (Cl. 260—249.6)

This invention relates to new derivatives of 2,3-dialdehyde starch and melamine or substituted melamines which may be designated as "polyglucosylol-melamine" compounds, and a process for making these derivatives.

The novel compositions of this invention are prepared by the reaction of 2,3-dialdehyde starch (also called periodate oxidized starch, or, in short, oxystarch) with melamine or derivatives of melamine, such as benzoguanamine, N,N-diallylmelamine, and the like. This reaction proceeds in accordance with the following equation:

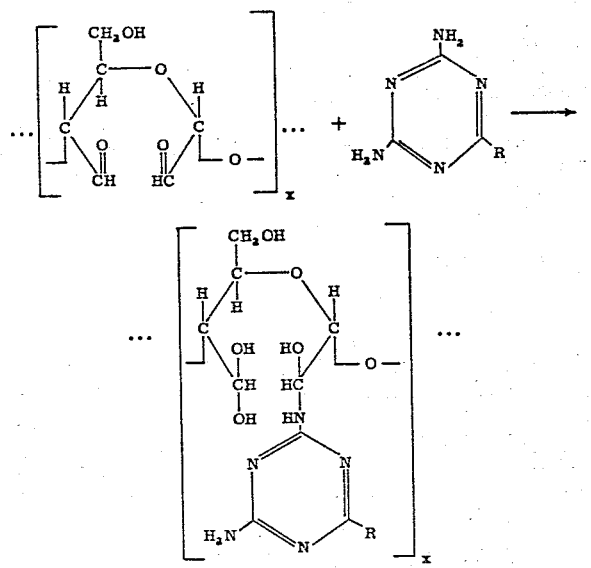

wherein R is an amino, a phenyl, or an aminodiallyl radical, and $x$ stands for the number of repeating units in the molecule, which may number as many as several thousand.

As illustrated by the above graphic formula of the reaction product, one molecule of the given melamine compound reacts with one of the two aldehyde groups of most of the dialdehyde polymer units. This mode of reaction is borne out by gravimetric and nitrogen analyses as well as by a determination of the remaining potential carbonyl content and is further substantiated in prior art literature. For example, the existence of this type of molecular structure, which results from an addition reaction with only one aldehyde group, was stipulated for a urea derivative by J. W. Sloan, et al. in Ind. & Eng. Chem. v. 48, p. 1169, 1956, and for a phenylhydrazine derivative by L. Mester J. Am. Chem. Soc. v. 77, p. 5452, 1955. Also, the solubility of the subject compounds in aqueous bisulfite solutions under short heating indicates the presence of the free potential carbonyl groups.

The subject compounds are prepared in accordance with the following procedure:

The melamine in the form of its acetate or the desired substituted melamine is dissolved at elevated temperatures in water or in a suitable organic solvent which is completely or partially water-miscible. Upon dissolution of the melamine compound, oxystarch and an acidic catalyst are added under stirring to give a reaction mixture in slurry form. Melamine or its derivative then reacts with oxystarch at temperatures of between 50 to 110° C. in from 1 to 4 hours. The preferred acidic catalysts are sulfuric and acetic acids. As organic solvents, alcohols, preferably n-butanol, and ethers, preferably dioxan, and mixtures of these with water may be used to furnish the reaction medium. Significantly, this reaction medium functions simultaneously both as solvent for the melamine reactant and as dispersing agent for 2,3-dialdehyde starch.

Two appreciable technological advantages inhere in the use of the slurry process described above: (1) there is no formation of resinous by-products and (2) the final products are almost homogeneous; that is, they contain no crystalline materials as shown by microscopic examination.

The dialdehyde starch used as starting material for this "polyglucosylol-melamine" compound may be conveniently and economically prepared by the electrolytic procedure disclosed in U.S. Patent No. 2,713,553. It may also generally be made by the well known chemical oxidation of starch with periodic acid. The above mentioned melamine compounds are commercially available.

The new melamine-modified oxystarch polymers can be recovered as amorphous white powders through the steps of direct filtration, washing with water, methanol or acetone or other suitable solvents or mixtures thereof to remove unreacted melamine (derivatives) and drying in an oven for several hours. The desired final products are insoluble in water, aqueous mineral acids and most organic solvents, but are partially soluble in aqueous sodium hydroxide, bisulfite and ammonium hydroxide at ordinary temperatures and completely soluble with slight heating. Their reduced solubility in mineral acids as well as their increased stability, as compared with dialdehyde starch, are believed to be due to the formation of cross-linkages, which may be inter-molecular as well as intra-molecular. Corresponding methylene configurations in a certain percentage of the polymer units may also exist due to dehydration. On the whole, it must be appreciated that the exact nature of the inter- and intra-molecular arrangements are difficult to establish.

The subject compounds of this invention have utility in the plastics industry as molding powders, in the textile industry for yielding crease and crush-proof fabrics; and also in the surface coatings, laminating resins, and paper resins industries. These compounds are also useful as chemical intermediates.

Although this specification is concerned with a method of reacting oxystarch with melamine and substituted melamines, it is to be understood that the scope of this invention encompasses reactions of other oxypolysaccarides, such as oxycellulose and the like, with mono-substituted melamines having substituents different from those mentioned above as well as di-substituted melamines, the limitation being that the melamine compounds contain at least one free amino group.

The novel compositions of this invention and the process for their preparation may be more clearly explained with reference to the following illustrative examples:

EXAMPLE I

*Reaction of 2,3-dialdehyde starch with melamine (2,4,6-triamino-s-triazine)*

(1) 26 g. (.205 mole) melamine.
(2) 450 ml. water.
(3) 50 ml. glacial acetic acid.
(4) 24.7 g. oxystarch (assay 73.3%, 14.7% moisture) = 16.1 g. pure oxystarch=0.1 mole.

(1), (2) and (3) were charged to a 1 liter beaker equipped with a stirrer and thermometer. While stirring rapidly, the mixture was heated to 80° C., the temperature at which the melamine went into solution. Then (4) was added, and without further heating the slurry was stirred continuously for two hours, after which time the mixture had a final temperature of 30–35° C. It was then filtered and washed with 20% aqueous acetic acid to remove the unreacted melamine. (The excess of melamine used can be recovered by neutralizing the mother liquor with sodium hydroxide). The filtered "polyglucosylol-melamine-acetate" was dispersed in 200 ml. of water and, under stirring, was neutralized with sodium hydroxide solution. The free base was filtered, washed with water and methanol, followed by washing with acetone and then dried at 50–60° C. Yield: 36 g. (100% of theory). Anal. calcd. for a 11.3% moisture-containing product obtained from a starting material with 73.3% content of oxystarch: N, 19.0. Found: N, 20.5. Carbonyl content found: 34.4.

EXAMPLE II

*Reaction of 2,3-dialdehyde starch with benzoguanamine (2,4-diamino-6-phenyl-s-triazine)*

(1) 21.5 g. (.117 mole) benzoguanamine.
(2) 300 ml. n-butanol.
(3) 0.5 ml. sulfuric acid (50%).
(4) 22.5 g. oxystarch (assay 73.3%, moisture 14.7%) = 14.2 g. pure oxystarch = 0.091 mole.

(1), (2) and (3) were charged to a 500 ml. three-necked flask equipped with a stirrer, thermometer, and reflux condenser, and heated at 110° C. until (1) was completely dissolved. Then (4) was charged to the flask and without further heating, under rapid stirring, the slurry was allowed to cool slowly. At 40° C. (after 1 hour) the slurry was separated by filtration. The solid was washed with 50 ml. methanol/acetone (1:1), to remove unreacted benzoguanamine followed by washing with acetone and was then dried. Yield: 39 g. (103% of theory). Anal. calcd. for a 3.5% moisture-containing product obtained from a starting material with 73.3% content of oxystarch: N, 14.2. Found: N, 16.3. Carbonyl content found: 30.3.

EXAMPLE III

*Reaction of 2,3-dialdehyde starch with N,N-diallylmelamine (2,4-diamino-6-diallylamino-s-triazine)*

(1) 28.8 g. (.140 mole) N,N-diallylmelamine.
(2) 80 ml. dioxan.
(3) 20 ml. water.
(4) 1 ml. sulfuric acid (50%).
(5) 12.0 g. oxystarch (assay 73.3%, 14.7% moisture) = 7.5 g. pure oxystarch = .047 mole.

(1), (2), (3), (4) and (5) were charged to a 250 ml. three-necked flask equipped with a stirrer, thermometer, and reflux condenser. The slurry was then heated for 4 hours at 50–60° C. on a water bath. After cooling at room temperature, 100 ml. acetone was added to facilitate quantitative precipitation and better filtration of the partially dispersed colloid polymer. The precipitate was filtered, washed with acetone and then dried at room temperature. Yield: 20 g. (100% of theory). Anal. calcd. for a 5.1% moisture-containing product obtained from a starting material with 73.3% content of oxystarch: N, 15.9. Found: N, 14.9.

In summary, the instant invention pertains to novel melamine-oxystarch polymers obtained by reacting 2,3-dialdehyde starch with melamine or substituted melamines in the proportion of 1 mole of the melamine compound per mole of 2,3-dialdehyde starch polymer units in the presence of a suitable reaction medium and an acidic catalyst, preferably sulfuric or acetic acids. This reaction proceeds at temperatures of from 50–110° C. in 1 to 4 hours.

What is claimed is:

1. A condensation product obtained by reacting in slurry a dialdehyde polysaccharide with an amino triazine selected from the group consisting of melamine, benzoguanamine and N,N-diallylmelamine in the presence of an inert reaction medium selected from the group consisting of water, n-butanol, dioxan, and mixtures thereof, and an acid catalyst selected from the group consisting of sulfuric acid and acetic acid, at a temperature of about from 50° C. to 110° C. for about from 1 to 4 hours.

2. A condensation product according to claim 1 wherein the dialdehyde polysaccharide is dialdehyde starch.

3. A condensation product obtained by reacting in slurry dialdehyde starch with melamine in the presence of an inert reaction medium selected from the group consisting of water, n-butanol, dioxan, and mixtures thereof, and an acid catalyst selected from the group consisting of sulfuric acid and acetic acid, at a temperature of about from 50° C. to 110° C. for about from 1 to 4 hours.

4. A condensation product obtained by reacting in slurry dialdehyde starch with benzoguanamine in the presence of an inert reaction medium selected from the group consisting of water, n-butanol, dioxan, and mixtures thereof, and an acid catalyst selected from the group consisting of sulfuric acid and acetic acid, at a temperature of about from 50° C. to 110° C. for about from 1 to 4 hours.

5. A condensation product obtained by reacting in slurry dialdehyde starch with N,N-diallylmelamine in the presence of an inert reaction medium selected from the group consisting of water, n-butanol, dioxan, and mixtures thereof, and an acid catalyst selected from the group consisting of sulfuric acid and acetic acid, at a temperature of about from 50° C. to 110° C. for about from 1 to 4 hours.

References Cited in the file of this patent

UNITED STATES PATENTS

| | | |
|---|---|---|
| 2,301,509 | Bock et al. | Nov. 10, 1942 |
| 2,448,338 | Widmer | Aug. 31, 1948 |
| 2,502,520 | Hansen | Aug. 4, 1950 |
| 2,880,236 | Mehltretter et al. | Mar. 31, 1959 |
| 2,894,945 | Hofreiter et al. | July 14, 1959 |
| 2,915,502 | Albrecht | Dec. 1, 1959 |

FOREIGN PATENTS

| | | |
|---|---|---|
| 500,925 | Canada | Mar. 23, 1954 |

OTHER REFERENCES

Jackson et al.: Journal of the American Chem. Soc., vol. 59, pages 2049–2050 (1937).

Sloan et al.: Industrial and Engineering Chemistry, vol. 48, pages 1165–1172 (1956).